Feb. 10, 1942.     H. GERDIEN     2,272,836
HEMADYNAMOMETER
Filed Feb. 24, 1938
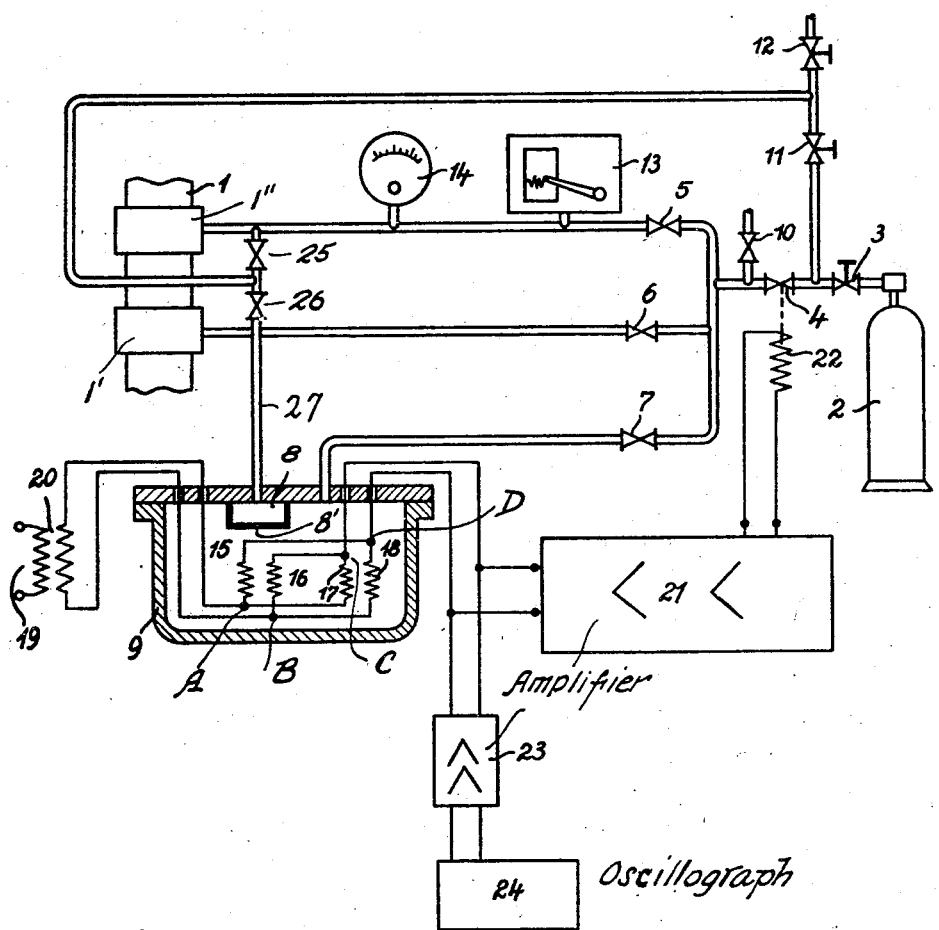
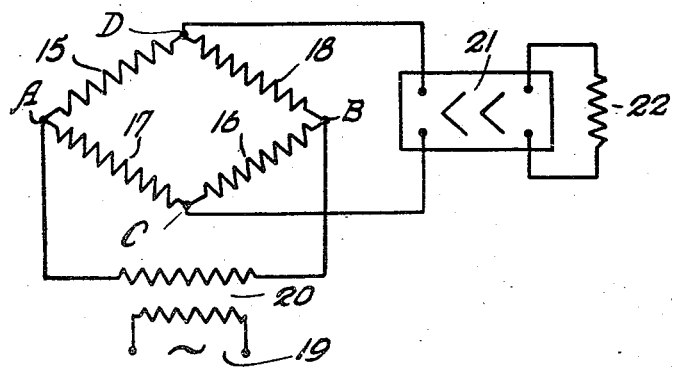

Patented Feb. 10, 1942

2,272,836

UNITED STATES PATENT OFFICE 2,272,836

HEMADYNAMOMETER

Hans Gerdien, Berlin-Charlottenburg, Germany, assignor to Siemens & Halske Aktiengesellschaft, Siemensstadt, near Berlin, Germany, a corporation of Germany Application February 24, 1938, Serial No. 192,309
In Germany March 12, 1937

4 Claims. (Cl. 128—2.05)

The present invention relates to improvements in hemadynamometers.

Apparatus for continuously measuring and recording the pressure of the blood, operating according to the compensation method is known by U. S. Patent No. 2,039,000 to Hesse. In such an apparatus a pneumatic arm-bandage or cuff is supplied with compressed air through a conduit which is also connected to an air-tight chamber in which a device regulating the air supply to the cuff is so arranged that it is controlled by the fluctuations of the air pressure caused by the pulse beat. This known apparatus contains a contact arrangement whose movable member is supported in a way similar to that of the mechanism of an electric measuring instrument and carries a disk moved by rushes of air issuing from a nozzle.

In the known apparatus, the contact does not operate exactly at the systolic pressure limit at which the pressure in the arm-bandage is no longer influenced by the blood pressure, but operates at a pressure which is lower than the systolic limit. This undesired pressure difference is not even constant, but fluctuates, particularly for physiological reasons, so that it is not possible to correct the measuring result as to this difference. Furthermore, the contact must be very accurately adjusted and the closing of the circuit is uncertain, particularly in the case of weak pulse beats. Besides, the contact is very sensitive to vibrations.

An object of the invention is to improve the accuracy of the measurings so that the pressure indicated or recorded actually corresponds to the pressure to be determined.

Other objects are to render the continuously reading hemadynamometer independent of any particular position of the apparatus, and to eliminate the great sensitiveness to vibrations or shocks of the prior recording hemadynamometers.

Still another object is to obviate the necessity of accurately adjusting a sensitive mechanism, especially a movable contact mechanism.

An object also is to decrease the sluggishness of operation so that the hemadynamometer is capable of accurately measuring the blood pressure.

The invention, finally, aims at rendering a hemadynamometer capable of quantitative measurings of the blood pressure.

According to the invention, a hemadynamometer is combined with a bolometer arrangement in such a way that the fluctuations of the pressure, caused in a pneumatic arm-bandage, are caused to produce rushes or puffs of air, and that these rushes act on a set of bolometric resistances which in turn effects a control of the air supply to the arm-bandage. Since an apparatus of this kind has no sensitive movable parts it is insensitive to vibrations and is not influenced when it changes its position so that it may also be employed on vehicles. The novel apparatus operates without appreciable retardation so that an accurate measurement and record of the blood pressure is possible. A further advantage consists in the fact that the bolometer arrangement operates also quantitatively in response to the magnitude of the pulsations so that the latter if desired may be recorded by an oscillograph which may, for instance, be connected to the output side of the bolometer arrangement through an amplifier.

In the accompanying drawing is shown an embodiment of the invention in diagrammatic form.

Fig. 1 illustrates the complete hemadynamometric arrangement; and

Fig. 2 illustrates the electric circuit connections of the same arrangement separately in a simplified and more schematical manner.

To the upper arm 1 of the person to be examined is tightly strapped an arm-bandage having two air cushions 1' and 1" which are connected by a conduit system with a flask 2 for compressed air through adjustable valves 3, 5, 6 and a controlled valve 4. Air cushion 1" communicates through throttle valves 25 and 26 and a conduit 27 with a slit nozzle 8 having opening 8' and arranged in an air-tight chamber 9. Chamber 9 also communicates with the conduit system through an adjustable valve 7. A suitably adjusted valve 10 permits the air to gradually flow out of the system when the valve 4 is closed. 11 denotes an inlet valve for rapidly filling the arm-bandage and 12 an escape valve which may be operated by hand. To the conduit leading to the upper cushion 1" is connected a recording pressure measuring instrument 13 and, if desired, also a pressure indicating instrument 14.

Inside the chamber 9 are arranged four bolometric resistors 15, 16, 17 and 18 which are connected through a transformer 20 with an alternating current source and through an amplifier 21 with a winding 22 which controls the valve 4. Fig. 2, showing the electric circuit of the apparatus in a more schematical way, indicates that the four resistors 15, 16, 17 and 18 form the four branches of a Wheatstone bridge, the input points A and B of which are connected with the transformer 20, while the output points C and D, i. e. the bridge diagonal, are connected to the amplifier 21. If the bridge is balanced, no current flows through the diagonal so that the amplifier is not energized. It is to be noted that the effective resistance of the four resistors depends upon their temperature and, further, that the two resistors 15 and 16 lying in two opposite branches of the bridge, are located near the nozzle 8 so that they both are cooled by the air puffs emitted from the nozzle, while the two other resistors 17 and 18 are not exposed to such cooling effect. It therefore is apparent that the puffs caused, by the pressure pulsations in cushion 1″, to issue from nozzle 8, disturb the balance of the bridge and thus produce a voltage difference to appear between the diagonal points D and C so that a current is passed through the amplifier 21 to winding 22 which actuates valve 4 until the puff has ceased and the bridge balance is restored. Since the chamber 9 is also connected through valve 7 with the conduit system, the pressure within the chamber always corresponds to that in the conduit system. Therefore no puff of air is ejected from nozzle 8 if, by actuating valves 11 and 4, the pressure in the conduit system and in the bandage is varied or lowered. Thus only the pressure fluctuations caused by the pulse beats are effective in unbalancing the resistor bridge and in actuating the apparatus connected thereto. An oscillograph 24 may be connected, if desired, to the output terminal of the bolometer bridge through an amplifier 23.

The arrangement described in the foregoing is applied as follows. After the bandage containing cushions 1′ and 1″ has been strapped to the arm of the patient, the valves having a proper adjustment, the bandage is inflated by opening valve 11 until a starting pressure according to the measurement to be taken is obtained. When the systolic blood pressure is to be determined, this starting pressure is reached when the fluctuations caused by the pulse beat commence. As soon as these fluctuations become apparent at the instrument 14, the operator closes the valve 11. The further operation then occurs automatically. The pressure fluctuations in cushion 1″ cause corresponding rushes of air to emit from nozzle 8 and to cool resistors 15 and 16, thus causing a corresponding unbalance of the bridge. The pulse oscillations are thereby converted to a certain extent into corresponding voltage surges at the output side of the bolometer bridge, which surges are supplied through amplifier 21 to the control winding 22 of the valve 4, thus opening the latter. By a retarding device combined in a known manner with the amplifier 21, the valve 4 is kept open upon each pulse beat during a suitably chosen period. Each pulse beat thus by actuating valve 4 increases the pressure in the bandage gradually until the systolic limit is surpassed. At this limit the fluctuations cease so that now valve 4 is no longer kept open and the air escaping through valve 10 gradually lowers the pressure in the conduit system and in the bandages. As soon as the receding pressure again reaches the systolic limit, a new fluctuation is caused by the pulse beat, which fluctuation reopens the valve 4 and therefore brings about another increase in pressure etc. These pressure variations about the systolic limit are continuously indicated by the manometer 14 and recorded by the pressure recording instrument 13, the lower apices of the pressure curve representing the systolic blood pressure.

What is claimed is:

1. A hemadynamometer operative according to the compensation method, comprising in combination a pneumatic arm-bandage, a hermetically-closed chamber, a conduit connecting said bandage with said chamber so as to produce puffs of gas in said chamber in response to fluctuations of the pressure in said bandage, an instrument for measuring said pressure, means in communication with said bandage and said chamber for supplying compressed gas to said bandage and said chamber, said means comprising a device for controlling said supply, a set of bolometric resistors arranged in said chamber near said conduit so as to be exposed to said puffs of gas, a current source connected with said set of resistors for heating said resistors, and electric connecting means between said resistors and said control device for adjusting said device in response to the resistance variations of said resistors caused by said puffs.

2. A hemadynamometer operative according to the compensation method, comprising in combination a pneumatic arm-bandage, a hermetically-closed chamber, means in communication with said bandage and said chamber for supplying compressed gas to said bandage and said chamber, said means comprising a device for controlling said supply, a conduit interconnecting said bandage and said chamber, a nozzle disposed in said chamber at the end of said conduit for producing puffs of gas in accordance with fluctuations of the pressure in said bandage, an instrument for measuring said pressure, a bridge network of bolometric resistors disposed within said chamber and having two opposite branches arranged near said nozzle so as to be exposed to said puffs, the two other branches of said network being arranged outside of the range of said puffs, an electric current source connected with said bridge network and an amplifying arrangement connected between said bridge network and said control device for adjusting said device in response to resistance variations of said resistors caused by said puffs.

3. A hemadynamometer operative according to the compensation method, comprising in combination a pneumatic arm-bandage, a hermetically-closed chamber, a conduit connecting said bandage with said chamber so as to produce puffs of gas in said chamber in response to fluctuations of the pressure in said bandage, an instrument for measuring said pressure, means in communication with said bandage and said chamber for supplying compressed gas to said bandage and said chamber, said means comprising a device for controlling said supply, a bolometric bridge having resistors arranged within said chamber near said conduit so as to be exposed to said puffs when in operation, a current source connected with the input points of said bridge, an operative connection between the output points of said bridge and said device for adjusting said device in response to resistance variations of said bridge, and an oscillograph also connected with the output points of said bridge for indicating said resistance variations.

4. A hemadynamometer operative according to the compensation method, comprising in combination a pneumatic arm-bandage, a hermetically-closed chamber, a conduit connecting said bandage with said chamber so as to produce puffs of gas in said chamber in response to fluctuations of the pressure in said bandage, a conduit system communicating with said bandage and said chamber for supplying compressed gas to said bandage and said chamber, a pressure supply valve connected in the intake portion of said conduit system, an electric control means operatively associated with said valve, a relief valve connected with said conduit system for gradually decreasing the pressure in said system, a set of bolometric resistors arranged in said chamber near said conduit so as to be exposed to said puffs of gas, a current source connected with said set of resistors for heating said resistors, and an operative connection between said resistors and said control means for adjusting said valve in response to the resistance variations of said bolometric resistors caused by said puffs.

HANS GERDIEN.